(12) United States Patent
Shiba et al.

(10) Patent No.: US 12,519,130 B2
(45) Date of Patent: Jan. 6, 2026

(54) ION CONDUCTIVE SOLID AND ALL-SOLID-STATE BATTERY

(71) Applicant: CANON OPTRON, INC., Ibaraki (JP)

(72) Inventors: Yoshitaka Shiba, Tochigi (JP); Noriko Sakamoto, Tochigi (JP); Kentaro Doguchi, Tochigi (JP); Takeshi Kobayashi, Ibaraki (JP); Toyoki Okumura, Osaka (JP); Hironori Kobayashi, Osaka (JP); Tomonari Takeuchi, Osaka (JP)

(73) Assignee: CANON OPTRON, INC., Ibaraki (JP)

( * ) Notice: Subject to any disclaimer, the term of this patent is extended or adjusted under 35 U.S.C. 154(b) by 769 days.

(21) Appl. No.: 17/832,982

(22) Filed: Jun. 6, 2022

(65) Prior Publication Data

US 2022/0302497 A1  Sep. 22, 2022

Related U.S. Application Data

(63) Continuation of application No. PCT/JP2020/043693, filed on Nov. 24, 2020.

(30) Foreign Application Priority Data

Dec. 20, 2019 (JP) .................................. 2019-230724
Apr. 15, 2020 (JP) .................................. 2020-072661

(51) Int. Cl.
*H01M 10/0562* (2010.01)
*C01F 17/32* (2020.01)
*H01M 10/0525* (2010.01)
*H01M 10/0585* (2010.01)

(52) U.S. Cl.
CPC ......... *H01M 10/0562* (2013.01); *C01F 17/32* (2020.01); *H01M 10/0525* (2013.01); *H01M 10/0585* (2013.01); *H01M 2300/0074* (2013.01)

(58) Field of Classification Search
None
See application file for complete search history.

(56) References Cited

U.S. PATENT DOCUMENTS

| | | | |
|---|---|---|---|
| 9,153,838 | B2 | 10/2015 | Ogasa |
| 2012/0308900 | A1 | 12/2012 | Ogasa |
| 2019/0229369 | A1* | 7/2019 | Katoh .................. C01G 23/002 |

FOREIGN PATENT DOCUMENTS

| | | |
|---|---|---|
| CN | 102021651 A | 4/2011 |
| CN | 104372410 A | 2/2015 |
| CN | 109713363 A | 5/2019 |
| JP | 2012-246196 A | 12/2012 |

(Continued)

OTHER PUBLICATIONS

Czirr et al., IEEE Trans. Nucl. Sci. 2001, 43, 1158-1161 (Year: 2001).*

(Continued)

Primary Examiner — Jeffrey T Barton
(74) Attorney, Agent, or Firm — VENABLE LLP

(57) ABSTRACT

An ion conductive solid comprising an oxide represented by general formula: $Li_{6-x-y-2z}Y_{1-x-y-z}M1_xM2_yM3_zB_3O_9$ in formula, M1 and M2 are each independently at least one metal element selected from a group of Zr, Ce and Sn, M3 is Nb, and x, y, and z represent real numbers satisfying $0.000 \leq x+y < 1.000$, $0.000 \leq z < 1.000$, and $0.000 < x+y+z < 1.000$.

6 Claims, 4 Drawing Sheets

(56) References Cited

FOREIGN PATENT DOCUMENTS

| WO | 2019/102762 | A1 | 5/2019 |
| WO | 2021/124812 | A1 | 6/2021 |
| WO | 2022/254753 | A1 | 12/2022 |
| WO | 2022/254754 | A1 | 12/2022 |
| WO | 2022/254755 | A1 | 12/2022 |
| WO | 2022/254756 | A1 | 12/2022 |
| WO | 2022/254757 | A1 | 12/2022 |

OTHER PUBLICATIONS

TÃ³th et al., J. Cryst. Growth 2012, 346, 69-74 (Year: 2012).*
Lopez-Burmudez et al., J. Mater. Chem. A 2016,4, 6972-6979 (Year: 2016).*
Hashimoto et al., U.S. Appl. No. 18/460,974, filed Sep. 5, 2023.
Kobayashi et al., U.S. Appl. No. 18/242,209, filed Sep. 5, 2023.
Shiba et al., U.S. Appl. No. 18/242,204, filed Sep. 5, 2023.
Hashimoto et al., U.S. Appl. No. 18/460,956, filed Sep. 5, 2023.
Shiba et al., U.S. Appl. No. 18/460,986, filed Sep. 5, 2023.
Yiyi Ou et al., Impacts of 5d Electron Binding Energy and Electron-Phonon Coupling on Luminescence of Ce3+ in Li6Y(BO3)3, 9 RSC Adv. 7908-7915 (2019).
Toyoki Okumura et al., "All-Solid-State Lithium-Ion Battery Using Li2.2C0.8B0.2O3 Electrolyte" 28 Solid State Ionics 248-252 (2016).
International Search Report in International Application No. PCT/JP2020/043693 (Feb. 2021).
Amendment Under Article 19(1) (Rule 46) in International Application No. PCT/JP2020/043693 (Apr. 2021).

* cited by examiner

— Comparative Example 1
— Example 1
— Example 2
— Example 3
— Example 4
— Example 5
— Example 6
— Example 7
— Example 8
— Example 9
— Example 10
— Example 11
— Example 13
— Example 14
— Example 15
— Example 16
— Example 17
— Example 21
— Example 22
— Example 23

2θ (deg)

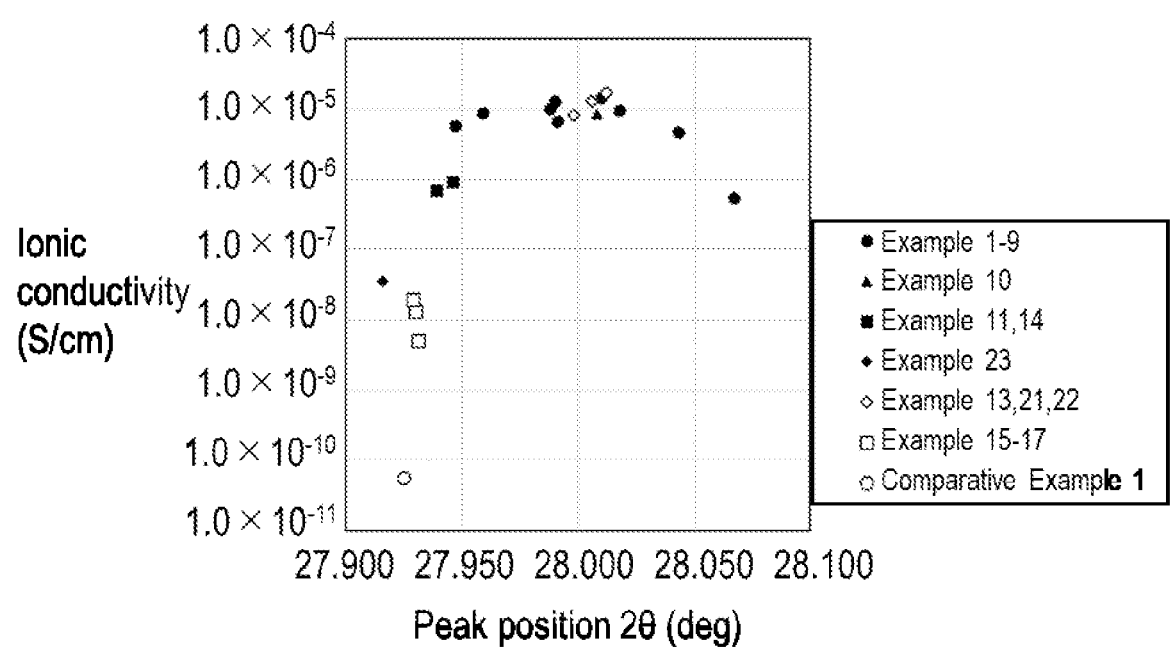

ION CONDUCTIVE SOLID AND ALL-SOLID-STATE BATTERY

CROSS REFERENCE TO RELATED APPLICATIONS

This application is a Continuation of PCT International Application No. PCT/JP2020/043693, filed on Nov. 24, 2020, which is claiming priority of Japanese Patent Application No. 2019-230724, filed on Dec. 20, 2019, and Japanese Patent Application No. 2020-072661, filed on Apr. 15, 2020, all of which are hereby expressly incorporated by reference into the present application.

BACKGROUND OF THE INVENTION

Field of the Invention

The present disclosure relates to an ion conductive solid and an all-solid-state battery.

Description of the Related Art

Conventionally, light-weight and high-capacity lithium ion secondary batteries have been included in mobile devices such as smartphones and notebook computers, and transport devices such as electric vehicles and hybrid electric vehicles.

However, since liquids containing combustible solvents have been used as electrolytes in conventional lithium ion secondary batteries, the leakage of the combustible solvents and ignition in the case of the short circuit of the batteries have been feared. Thus, secondary batteries using, as electrolytes, ion conductive solids different from the liquid electrolytes, to secure safety, have received attention in recent years. Such secondary batteries have been called all-solid-state batteries.

Solid electrolytes such as oxide-based solid electrolytes and sulfide-based solid electrolytes have been widely known as the electrolytes used in the all-solid-state batteries. Among them, the oxide-based solid electrolytes do not react with moisture in atmosphere, and do not generate hydrogen sulfide. Thus, the oxide-based solid electrolytes are safer than the sulfide-based solid electrolytes.

Such an all-solid-state battery includes: a cathode comprising a cathode active material; an anode comprising an anode active material; an electrolyte that is placed between the cathode and the anode, and includes an ion conductive solid; and, if necessary, a current collector (the cathode active material and the anode active material are collectively referred to as "electrode active material"). In a case in which the all-solid-state battery is manufactured using an oxide-based solid electrolyte, heat treatment is performed to reduce the contact resistance between the particles of an oxide-based material included in the solid electrolyte. However, in a conventional oxide-based solid electrolyte, a high temperature of 900° C. or more is required in the heat treatment, and the solid electrolyte and the electrode active material may therefore react to form a high-resistance phase. The high-resistance phase may lead to a decrease in the ionic conductivity of the ion conductive solid, and in turn to a decrease in the output of the all-solid-state battery.

Examples of oxide-based solid electrolytes that can be produced by heat treatment at a temperature of less than 900° C. include $Li_{2+x}C_{1-x}B_xO_3$ (Solid State Ionic 288 (2016) 248-252).

SUMMARY OF THE INVENTION

The present disclosure provides: an ion conductive solid that can be produced by heat treatment at low temperature and has a high ion conductivity; and an all-solid-state battery comprising the ion conductive solid.

An ion conductive solid comprising an oxide represented by general formula: $Li_{6-x-y-2z}Y_{1-x-y-z}M1_xM2_yM3_zB_3O_9$
in formula, M1 and M2 are each independently at least one metal element selected from a group of Zr, Ce and Sn, M3 is Nb, and x, y, and z represent real numbers satisfying $0.000 \leq x+y < 1.000$, $0.000 \leq z < 1.000$, and $0.000 < x+y+z < 1.000$.

An all-solid-state battery of the present disclosure is an all-solid-state battery comprising at least:
a cathode comprising a cathode active material;
an anode comprising an anode active material; and
an electrolyte,
wherein at least one selected from a group consisting of the cathode, the anode, and the electrolyte includes the ion conductive solid of the present disclosure.

In accordance with one aspect of the present disclosure, there can be obtained: an ion conductive solid that can be produced by heat treatment at low temperature and has a high ion conductivity; and an all-solid-state battery comprising the ion conductive solid. Further features of the present disclosure will become apparent from the following description of exemplary embodiments with reference to the attached drawings.

BRIEF DESCRIPTION OF THE DRAWINGS

FIG. 3 shows diffraction curves, obtained in XRD, at 2θ=27.5° to 28.5°.

FIG. 4 is a diagram showing a relationship between the ionic conductivity of an ion conductive solid and a diffraction peak position measured by XRD.

DESCRIPTION OF THE EMBODIMENTS

Figure 1:
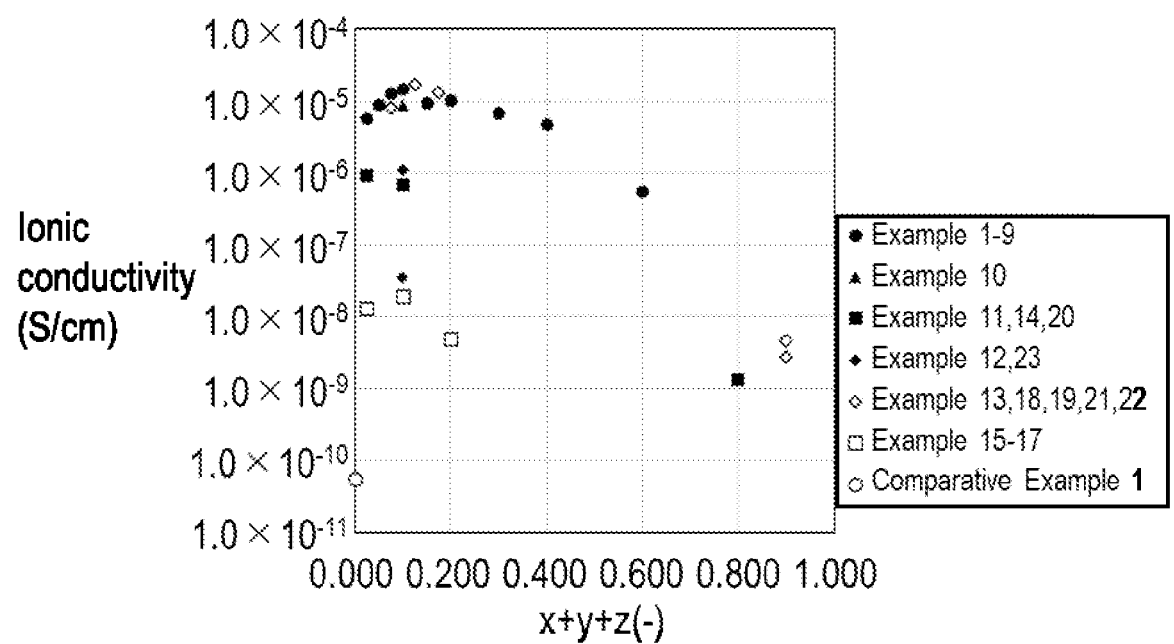
FIG. 1 is a diagram showing a relationship between the ionic conductivity of an ion conductive solid and a value of x+y+z in general formula: $Li_{6-x-y-2z}Y_{1-x-y-z}M1_xM2_yM3_zB_3O_9$.

In the present disclosure, a description of "XX or more and YY or less" or "XX to YY" representing a numerical range means a numerical range including lower and upper limits which are end points, unless otherwise specified.

In the present disclosure, "solid" refers to the state of matter having certain shape and volume, in the three states of matter. For example, a substance in a powdery state is also included in "solid".

An ion conductive solid of the present disclosure comprises an oxide represented by general formula: $Li_{6-x-y-2z}Y_{1-x-y-z}M1_xM2_yM3_zB_3O_9$.

In Formula, M1 and M2 each represent a tetravalent metal element, and the valence thereof is the valence of the tetravalent metal element M1 or M2. Moreover, in Formula, M3 represents a pentavalent metal element, and the valence thereof is the valence of the pentavalent metal element M3. Further, in Formula, x, y, and z represent real numbers satisfying $0.000 \leq x+y < 1.000$, $0.000 \leq z < 1.000$, and $0.000 < x+y+z < 1.000$. It will be appreciated that x and y satisfy $0.000 \leq x < 1.000$ and $0.000 \leq y < 1.000$, respectively.

The reason that an ionic conductivity is improved in the ion conductive solid comprising the oxide represented by general formula as described above is presumed by the present inventors as follows.

Substitution of some of Y elements which are trivalent metal elements with M1, M2, and M3 which are tetravalent to pentavalent metal elements causes the balance of charge to be adjusted by the substitution between the elements having different valences, and therefore results in a state in which $Li^+$ in the crystal lattice is deficient. Since $Li^+$ neighboring on a place in which $Li^+$ is deficient moves to fill the place, the ionic conductivity is improved.

The ion conductive solid of the present disclosure preferably includes a monoclinic crystal structure. When the ion conductive solid includes a monoclinic crystal structure, a lattice constant is influenced to also influence a lattice volume and to be able to further influence an ionic conductivity, in the case of substituting some of $Y^{3+}$ elements with at least one selected from the group consisting of M1, M2 and M3 which are metal elements of which the valences are more than that of $Y^{3+}$ (that is, in the case of 0.000<x+y+z), as compared to $Li_6YB_3O_9$ including none of M1, M2, and M3 (that is, in the case of x=y=z=0.000).

In X-ray diffraction analysis (hereinafter also simply referred to as "XRD") using CuKα ray, a diffraction peak occurring at 2θ=around 28° can vary depending on the composition and the like of the ion conductive solid described above.

The ion conductive solid of the present disclosure preferably has a diffraction peak in the range of 2θ=27.915° to 28.100°, 27.920° to 28.100°, or 27.930° to 28.100° in XRD using CuKα ray. The ion conductive solid more preferably has a diffraction peak in the range of 2θ=27.940° to 28.050°, still more preferably has a diffraction peak in the range of 2θ=27.980° to 28.020°, and particularly preferably has a diffraction peak in the range of 2θ=27.980° to 28.010°.

The position of a diffraction peak occurring at 2θ=around 28° in XRD using the CuKα ray can be controlled by, e.g., adjusting the value of x+y+z in general formula as described above, and changing the metal elements represented by M1 to M3.

The ion conductive solid of the present disclosure preferably has a lattice volume of 752.00 Å³ or more, more preferably 752.55 Å³ or more, still more preferably 753.00 Å³ or more, and particularly preferably 753.40 Å³ or more.

The lattice volume is preferably 756.00 Å³ or less, more preferably 754.50 Å³ or less, still more preferably 754.00 Å³ or less, and particularly preferably 753.50 Å³ or less.

The numerical ranges can be optionally combined. The lattice volume can be set at, for example, 752.00 Å³ to 756.00 Å³.

The lattice volume of the ion conductive solid can be controlled by, e.g., adjusting the value of x+y+z in general formula as described above, and changing the metal elements represented by M1 to M3.

M1 and M2 in general formula as described above each represent a tetravalent metal element. Moreover, M3 in general formula as described above represents a pentavalent metal element.

Examples of M1 and M2 are each independently at least one metal element selected from a group consisting of Zr, Ce, and Sn.

Moreover, examples of M1 and M2 are each independently at least one metal element selected from a group consisting of Zr and Ce. Moreover, examples of M1 and M2 are each independently at least one metal element selected from a group consisting of Ce and Sn. Moreover, examples of M1 and M2 are each independently at least one metal element selected from a group consisting of Zr and Sn.

Further, examples of M1 and M2 are Zr. Further, examples of M1 and M2 are Ce. Further, examples of M1 and M2 are Sn.

Example of M3 is Nb

As such a metal element with which some of the Y elements are substituted, an element of which the ionic radius is close to that of Y is easily subjected to the substitution. Specific examples of candidates for the metal element include $Ce^{4+}$, $Zr^{4+}$, $Sn^{4+}$, $Ti^{4+}$, $Nb^{5+}$, and $Ta^{5+}$. Especially, some of the Y elements are easily substituted with $Ce^{4+}$, $Zr^{4+}$, $Sn^{4+}$, or $Nb^{5+}$ of which the ionic radius is closer to that of Y. Especially, some of the Y elements are more easily substituted with $Ce^{4+}$, $Zr^{4+}$, or $Nb^{5+}$.

In general formula as described above, x, y, and z represent real numbers satisfying 0.000≤x+y<1.000, 0.000≤z<1.000, and 0.000<x+y+z<1.000.

The lower limit value of x+y is preferably 0.010 or more, 0.020 or more, 0.030 or more, 0.040 or more, 0.050 or more, 0.060 or more, 0.070 or more, 0.080 or more, 0.090 or more, 0.100 or more, 0.110 or more, 0.120 or more, 0.130 or more, 0.140 or more, 0.150 or more, 0.200 or more, 0.250 or more, 0.300 or more, 0.350 or more, 0.400 or more, 0.450 or more, or 0.500 or more. The upper limit value of x+y is preferably 0.950 or less, 0.900 or less, 0.850 or less, 0.800 or less, 0.790 or less, 0.780 or less, 0.770 or less, 0.760 or less, 0.750 or less, 0.740 or less, 0.730 or less, 0.720 or less, 0.710 or less, 0.700 or less, 0.690 or less, 0.680 or less, 0.670 or less, 0.660 or less, 0.650 or less, 0.640 or less, 0.630 or less, 0.620 or less, 0.610 or less, or 0.600 or less. Moreover, the upper limit value of x+y may be set at less than 0.800. Further, the lower limit value of x+y may be set at more than 0.000. The numerical ranges can be optionally combined.

The lower limit value of z is preferably 0.010 or more, 0.020 or more, 0.030 or more, 0.040 or more, 0.050 or more, 0.060 or more, 0.070 or more, 0.080 or more, 0.090 or more, 0.100 or more, 0.110 or more, 0.120 or more, 0.130 or more, 0.140 or more, 0.150 or more, 0.200 or more, 0.250 or more, 0.300 or more, 0.350 or more, 0.400 or more, 0.450 or more, or 0.500 or more. The upper limit value of z is preferably 0.950 or less, 0.900 or less, 0.850 or less, 0.800 or less, 0.790 or less, 0.780 or less, 0.770 or less, 0.760 or less, 0.750 or less, 0.740 or less, 0.730 or less, 0.720 or less, 0.710 or less, 0.700 or less, 0.690 or less, 0.680 or less, 0.670 or less, 0.660 or less, 0.650 or less, 0.640 or less, 0.630 or less, 0.620 or less, 0.610 or less, or 0.600 or less. Moreover, the upper limit value of z may be set at less than 0.800. Further, the lower limit value of z may be set at more than 0.000. The numerical range can be optionally combined.

The ion conductive solid of the present disclosure may be allowed to be, for example, the following embodiments, but is not limited to the embodiments.

(1) It is acceptable that:
y and z satisfy y=z=0.000;
M1 is Zr; and
x satisfies 0.000<x<1.000 (preferably 0.000<x<0.800).

(2) It is acceptable that:
y and z satisfy y=z=0.000;
M1 is Ce; and
x satisfies 0.000<x<1.000 (preferably 0.000<x<0.800).

(3) It is acceptable that:
y and z satisfy y=z=0.000;
M1 is Sn; and
x satisfies 0.000<x<1.000 (preferably 0.000<x<0.800).

(4) It is acceptable that:
z satisfies z=0.000;
M1 is Zr; M2 is Ce; and
x+y satisfies 0.000<x+y<1.000 (preferably 0.000<x+y<0.800).
(5) It is acceptable that:
z satisfies z=0.000;
M1 is Zr; M2 is Sn; and
x+y satisfies 0.000<x+y<1.000 (preferably 0.000<x+y<0.800).
(6) It is acceptable that:
z satisfies z=0.000;
M1 is Ce; M2 is Sn; and
x+y satisfies 0.000<x+y<1.000 (preferably 0.000<x+y<0.800).
(7) It is acceptable that:
x and y satisfy x=y=0.000;
M3 is Nb; and
z satisfies 0.000<z<1.000 (preferably 0.000<z<0.800).

A method of producing the ion conductive solid of the present disclosure will now be described.

The method of producing the ion conductive solid of the present disclosure can be allowed to be, for example, the following aspect, but is not limited thereto.

A method of producing an ion conductive solid including an oxide represented by general formula: $Li_{6-x-y-2z}Y_{1-x-y-z}M1_xM2_yM3_zB_3O_9$, the method being able to include a baking step of heating the oxide at a temperature that is less than the melting point of the oxide (in formula, M1 and M2 each represent a tetravalent metal element, M3 represents a pentavalent metal element, and x, y, and z represent real numbers satisfying 0.000≤x+y<1.000, 0.000≤z<1.000, and 0.000<x+y+z<1.000).

The method of producing the ion conductive solid of the present disclosure can include: (1) a temporary baking step of producing the oxide represented by general formula as described above; and (2) a main baking step of heat-treating the obtained oxide at the temperature that is less than the melting point of the oxide.

The method of producing the ion conductive solid of the present disclosure, including the above-described temporary baking step and the above-described main baking step, will be described in detail below. However, the present disclosure is not limited to the following production method.

(1) Temporary Baking Step

In the temporary baking step, raw materials, such as $Li_3BO_3$, $H_3BO_3$, $Y_2O_3$, $ZrO_2$, $CeO_2$, and $Nb_2O_5$, of chemical reagent grade are weighed in stoichiometric amounts, and mixed to make, for example, $Li_{6-x-y-2z}Y_{1-x-y-z}M1_xM2_yM3_zB_3O_9$ (wherein M1 and M2 each represent a tetravalent metal element, M3 represents a pentavalent metal element, and x, y, and z represent real numbers satisfying 0.000≤x+y<1.000, 0.000≤z<1.000, and 0.000<x+y+z<1.000).

An apparatus used in the mixture is not particularly limited. For example, a pulverizing-type mixer such as a planetary ball mill can be used as the apparatus. The material and capacity of a container used in the mixture, and the material and diameter of the ball are not particularly limited, and can be selected as appropriate depending on the kinds and amounts of the raw materials used. As an example, a 45 mL container made of zirconia, and a ball that has a diameter of 5 mm and is made of zirconia can be used. Moreover, the conditions of mixture treatment are not particularly limited but can be set at, for example, a rotation number of 50 rpm to 2000 rpm, and a time of 10 minutes to 60 minutes.

The powder mixture of each of the raw materials described above is obtained by the mixture treatment. Then, the obtained powder mixture is pressure-molded to make pellets. A known pressure molding method such as a cold uniaxial molding method or a cold isostatic pressure molding method can be used as a pressure molding method. The condition of the pressure molding in the temporary baking step is not particularly limited but can be set at, for example, a pressure of 100 MPa to 200 MPa.

It is preferable that the obtained pellets are temporarily baked at around 400° C. to 700° C. (for example, 650° C.) using an atmosphere baking apparatus or the like, to perform solid-phase synthesis. The temperature in such a range sufficiently enables the solid-phase synthesis. The time of the temporary baking step is not particularly limited but can be set at, for example, around 700 minutes to 750 minutes (for example, 720 minutes).

The obtained, temporarily baked body is the oxide represented by general formula: $Li_{6-x-y-2z}Y_{1-x-y-z}M1_xM2_yM3_zB_3O_9$, as described above. A temporarily baked powder can also be obtained by pulverizing the temporarily baked body (oxide) using a mortar/pestle or a planetary mill.

(2) Main Baking Step

In the main baking step, at least one selected from the group consisting of the temporarily baked body and the temporarily baked powder obtained in the temporary baking step is pressure-molded and mainly baked to obtain a sintered body. The obtained sintered body is the ion conductive solid including the oxide represented by general formula: $Li_{6-x-y-2z}Y_{1-x-y-z}M1_xM2_yM3_zB_3O_9$.

It is acceptable to simultaneously perform the pressure molding and the main baking using discharge plasma sintering (hereinafter also simply referred to as "SPS"), hot press, or the like, or it is acceptable to produce pellets by cold uniaxial molding and to then perform the main baking in ambient atmosphere, oxidizing atmosphere, reducing atmosphere, or the like. Such conditions enable an ion conductive solid having a high ionic conductivity to be obtained without causing melting due to heat treatment. The condition of the pressure molding in the main baking step is not particularly limited but can be set at, for example, a pressure of 10 MPa to 100 MPa.

The temperature at which the main baking is performed is less than the melting point of the oxide represented by general formula: $Li_{6-x-y-2z}Y_{1-x-y-z}M1_xM2_yM3_zB_3O_9$. The temperature at which the main baking is performed is preferably less than 700° C., more preferably 680° C. or less, still more preferably 670° C. or less, and particularly preferably 660° C. or less. The lower limit of the temperature is not particularly limited. It is preferable to reduce the lower limit as much as possible. For example, the lower limit is 500° C. or more. The numerical ranges can be optionally combined, and can be set in a range of, for example, 500° C. or more and less than 700° C. Such a range enables the temporarily baked body to be inhibited from being melted or decomposed in the main baking step, and enables the sintered body that has been sufficiently sintered to be obtained.

The time for which the main baking step is performed can be changed as appropriate depending on the temperature at which the main baking is performed, and the like. The time is preferably 24 hours or less, and may be set at 1 hour or less. The time for which the main baking step is performed may be set at, for example, 5 minutes or more.

A method of cooling the sintered body (ion conductive solid) obtained in the main baking step is not particularly limited, but may be subjected to natural radiational cooling (radiational cooling in a furnace), to rapid cooling, or to slower cooling than natural radiational cooling, or may be maintained at a certain temperature during cooling.

An all-solid-state battery of the present disclosure will now be described.

An all-solid-state battery commonly comprises: a cathode comprising a cathode active material; an anode comprising an anode active material; an electrolyte that is placed between the cathode and the anode, and comprises an ion conductive solid; and, if necessary, a current collector.

The all-solid-state battery of the present disclosure comprises at least:
a cathode comprising a cathode active material;
an anode comprising an anode active material; and
an electrolyte,
wherein at least one selected from the group consisting of the cathode, the anode, and the electrolyte comprises the ion conductive solid of the present disclosure.

As used herein, the above-described term "comprise" refers to inclusion as a constituent, an element, or a property. For example, a case in which an electrode active material is contained in an electrode, and a case in which an electrode active material is applied to a surface of an electrode also correspond to the above-described term "comprise".

The all-solid-state battery of the present disclosure may be a bulk-type battery, or may be a thin-film battery. The specific shape of the all-solid-state battery of the present disclosure is not particularly limited, but examples of the shape include coin, button, sheet, and layered shapes.

The all-solid-state battery of the present disclosure comprises the electrolyte. In the all-solid-state battery of the present disclosure, at least the electrolyte preferably comprises the ion conductive solid of the present disclosure.

The solid electrolyte in the all-solid-state battery of the present disclosure may comprise the ion conductive solid of the present disclosure, or may comprise another ion conductive solid. The other ion conductive solid is not particularly limited but may comprise an ion conductive solid that is usually used in an all-solid-state battery, for example, LiI, $Li_3PO_4$, $Li_7La_3Zr_2O_{12}$, or the like. The content of the ion conductive solid of the present disclosure in the electrolyte in the all-solid-state battery of the present disclosure is preferably 25% by mass or more, more preferably 50% by mass or more, still more preferably 75% by mass or more, and particularly preferably 100% by mass.

The all-solid-state battery of the present disclosure comprises the cathode comprising the cathode active material. The cathode may comprise the cathode active material and the ion conductive solid of the present disclosure. As the cathode active material, a known cathode active material such as a sulfide comprising a transition metal element, or an oxide including lithium and a transition metal element can be used without particular limitation.

Further, the cathode may comprise a binder, an electroconductive agent, and/or the like. Examples of the binder include polyvinylidene fluoride, polytetrafluoroethylene, and polyvinyl alcohol. Examples of the electroconductive agent include natural graphite, artificial graphite, acetylene black, and ethylene black.

The all-solid-state battery of the present disclosure comprises the anode comprising the anode active material. The anode may comprise the anode active material and the ion conductive solid of the present disclosure. As the anode active material, a known anode active material such as an inorganic compound such as lithium, a lithium alloy, or a tin compound, a carbonaceous material that can absorb and release a lithium ion, or a conductive polymer can be used without particular limitation.

Further, the anode may comprise a binder, an electroconductive agent, and/or the like. As the binder and the electroconductive agent, binders and electroconductive agents similar to those mentioned in the cathode can be used.

The cathode and the anode can be obtained by a known method such as mixture, molding, heat treatment, or the like of raw materials. It is considered that, as a result, the ion conductive solid enters gaps and the like between such electrode active materials, to facilitate security of a conduction path for lithium ions. It is considered that the formation of a high-resistant phase generated by reaction between the ion conductive solid and the electrode active material can be suppressed because the ion conductive solid of the present disclosure can be produced by heat treatment at low temperature as compared to conventional technologies.

The above-described cathode and the above-described anode may comprise the current collector. As the current collector, a known current collector such as aluminum, titanium, stainless steel, nickel, iron, baked carbon, a conductive polymer, or electrically conductive glass can be used. In addition, aluminum, copper, or the like, of which a surface is treated with carbon, nickel, titanium, silver, or the like for the purpose of improving adhesiveness, electrical conductivity, oxidation resistance, and the like, can be used as the current collector.

The all-solid-state battery of the present disclosure can be obtained by a known method in which, for example, the cathode, the solid electrolyte, and the anode are layered, molded, and heat-treated. It is considered that the formation of a high-resistant phase generated by reaction between the ion conductive solid and the electrode active material can be suppressed because the ion conductive solid of the present disclosure can be produced by heat treatment at low temperature as compared to conventional technologies. Thus, it is considered that the all-solid-state battery superior in output characteristics can be obtained.

A method of measuring the composition and each physical property according to the present disclosure will now be described.

Identification of M1 to M3, and Method of Analyzing x, y, and z

The analysis of the composition of the ion conductive solid is performed by wavelength dispersion type fluorescent X-ray analysis (hereinafter also referred to as "XRF") using a sample solidified by a pressure-molding method. However, when the analysis is difficult due to a particle size effect and/or the like, it is preferable to vitrify the ion conductive solid by a glass bead technique, and to analyze the composition thereof by XRF. When the peaks of yttrium and a tetravalent or pentavalent metal overlap with each other in XRF, the composition analysis is preferably performed by inductively coupled plasma atomic emission spectrochemical analysis (ICP-AES).

In the case of XRF, ZSX Primus II manufactured by Rigaku Corporation is used as an analysis apparatus. The conditions of the analysis are set at use of Rh as the anode of an X-ray tube, vacuum atmosphere, an analysis diameter of 10 mm, an analysis range of 17 deg to 81 deg, a step of 0.01 deg, and a scanning speed of 5 sec/step. Moreover, the detection is performed by a proportional counter in the case of measuring a light element, while the detection is performed by a scintillation counter in the case of measuring a heavy element.

An element is identified based on the peak position of a spectrum obtained in XRF, and molar concentration ratios Y/M1, Y/M2, and Y/M3 are calculated based on a counting rate (unit: cps) which is the number of X-ray photons per unit time, to determine x, y, and z.

When one metal is identified as the tetravalent metal and no pentavalent metal is detected, the tetravalent metal is allocated to M1 in general formula.

Measurement of X-Ray Diffraction Peak, And Calculation of Lattice Volume

D8 ADVANCE manufactured by BrukerAXS is used in the X-ray diffraction analysis of the ion conductive solid.

The X-ray diffraction analysis (XRD) is performed using a CuKα ray source with an analytical sample obtained by putting, in a holder, a powder obtained by pulverizing the ion conductive solid with a mortar and a pestle, and then pressing a glass flat plate against the powder from above to evenly spread the powder.

Temperature is set at room temperature (25° C.), an analysis range is set at 10 deg to 70 deg, a step is set at 0.007, and a scanning speed is set at 0.1 step/second.

In a diffraction curve obtained in XRD, 2θ of a peak top generated at 2θ=28.000±0.200 deg derived from $Li_6YB_3O_9$ is determined as a peak position.

The lattice volume of a crystal phase is calculated using the diffraction curve obtained in XRD and structural analysis software TOPAS manufactured by BrukerAXS. The lattice volume is calculated by fitting and analyzing, by TOPAS, the diffraction curve obtained in XRD and the diffraction pattern of the crystal phase having a monoclinic crystal structure.

EXAMPLES

Examples in which the ion conductive solid of the present disclosure was specifically produced and evaluated as a sintered body are described below as Examples. The present disclosure is not limited to the following Examples.

Example 1

Temporary Baking Step

Using $Li_3BO_3$ (manufactured by Toshima Manufacturing Co., Ltd., purity of 99.9% by mass), $H_3BO_3$ (manufactured by KANTO CHEMICAL CO., INC., purity of 99.5%), $Y_2O_3$ (manufactured by Shin-Etsu Chemical Co., Ltd., purity of 99.9% by mass), and $ZrO_2$ (manufactured by Nippon Denko Co., Ltd., purity of 99.9%) as raw materials, each raw material was weighed in stoichiometric amounts so as to make $Li_{5.975}Y_{0.975}Zr_{0.025}B_3O_9$, and was mixed in a planetary mill P-7 manufactured by Fritsch GmbH at a disk rotation number of 300 rpm for 30 minutes. A ball with a diameter of 5 mm, made of zirconia, and a 45 mL container were used in the planetary mill.

Then, the mixed powder was cold uniaxially molded at 147 MPa using a 100 kN electrically operated press apparatus P3052-10 manufactured by NPa SYSTEM Co., Ltd., and temporarily baked in ambient atmosphere. The heating temperature was set at 650° C., and the retention time was set at 720 minutes.

The obtained, temporarily baked body was ground for 180 minutes at a disk rotation number of 230 rpm in the planetary mill P-7 manufactured by Fritsch GmbH, to produce a temporarily baked powder.

Main Baking Step

The temporarily baked powder obtained as described above was molded and mainly baked using a discharge plasma sintering machine SPS-625 (hereinafter also simply referred to as "SPS") manufactured by Fuji Dempa Kogyo Co., Ltd., to produce a sintered body of Example 1. The heating temperature was set at 630° C., the pressure was set at 30 MPa, and the retention time was set at 10 minutes.

Examples 2 to 9

Temporary Baking Step

A temporarily baked body and a temporarily baked powder were produced in the same step as that of Example 1 except that each of the raw materials described above was weighed in stoichiometric amounts so that x was a value set forth in Table 1.

Main Baking Step

The temporarily baked powder obtained as described above was molded and mainly baked by discharge plasma sintering (SPS), to produce each sintered body of Examples 2 to 9. Each heating temperature was set as listed in Table 1, each pressure was set at 30 MPa, and each retention time was set at 10 minutes.

Example 10

Temporary Baking Step

A temporarily baked body and a temporarily baked powder were produced in the same step as that of Example 1 except that each of the raw materials described above was weighed in stoichiometric amounts so that x was a value set forth in Table 1.

Main Baking Step

The temporarily baked powder obtained as described above was molded and mainly baked to produce a sintered body of Example 10. The main baking was performed in ambient atmosphere, the heating temperature was set at 650° C., and the retention time was set at 720 minutes.

Example 11

Temporary Baking Step

A temporarily baked body and a temporarily baked powder were produced in the same step as that of Example 1 except that using $Li_3BO_3$ (manufactured by Toshima Manufacturing Co., Ltd., purity of 99.9% by mass), $H_3BO_3$ (manufactured by KANTO CHEMICAL CO., INC., purity of 99.5%), $Y_2O_3$ (manufactured by Shin-Etsu Chemical Co., Ltd., purity of 99.9% by mass), and $CeO_2$ (manufactured by Shin-Etsu Chemical Co., Ltd., purity of 99.9%) as raw materials, each raw material was weighed in stoichiometric amounts so as to make $Li_{5.900}Y_{0.900}Ce_{0.100}B_3O_9$.

Main Baking Step

The temporarily baked powder obtained as described above was molded and mainly baked by discharge plasma sintering (SPS), to produce a sintered body of Example 11. The heating temperature was set at 660° C., the pressure was set at 30 MPa, and the retention time was set at 10 minutes.

Example 12

Temporary Baking Step

A temporarily baked body and a temporarily baked powder were produced in the same step as that of Example 1 except that using $Li_3BO_3$ (manufactured by Toshima Manufacturing Co., Ltd., purity of 99.9% by mass), $H_3BO_3$ (manufactured by KANTO CHEMICAL CO., INC., purity of 99.5%), $Y_2O_3$ (manufactured by Shin-Etsu Chemical Co., Ltd., purity of 99.9% by mass), and $Nb_2O_5$ (manufactured by MITSUI MINING & SMELTING CO., LTD., purity of 99.9%) as raw materials, each raw material was weighed in stoichiometric amounts so as to make $Li_{5.800}Y_{0.900}Nb_{0.100}B_3O_9$.

Main Baking Step

The temporarily baked powder obtained as described above was molded and mainly baked by discharge plasma sintering (SPS), to produce a sintered body of Example 12. The heating temperature was set at 600° C., the pressure was set at 30 MPa, and the retention time was set at 10 minutes.

Example 13

Temporary Baking Step

A temporarily baked body and a temporarily baked powder were produced in the same step as that of Example 1 except that using $Li_3BO_3$ (manufactured by Toshima Manufacturing Co., Ltd., purity of 99.9% by mass), $H_3BO_3$ (manufactured by KANTO CHEMICAL CO., INC., purity of 99.5%), $Y_2O_3$ (manufactured by Shin-Etsu Chemical Co., Ltd., purity of 99.9% by mass), $ZrO_2$ (manufactured by Nippon Denko Co., Ltd., purity of 99.9%), and $CeO_2$ (manufactured by Shin-Etsu Chemical Co., Ltd., purity of 99.9%) as raw materials, each raw material was weighed in stoichiometric amounts so as to make $Li_{5.875}Y_{0.875}Zr_{0.100}Ce_{0.025}B_3O_9$.

Main Baking Step

The temporarily baked powder obtained as described above was molded and mainly baked to produce a sintered body of Example 13. The main baking was performed in ambient atmosphere, the heating temperature was set at 650° C., and the retention time was set at 720 minutes.

Example 14

Temporary Baking Step

A temporarily baked body and a temporarily baked powder were produced in the same step as that of Example 11 except that each of the raw materials described above was weighed in stoichiometric amounts so that x was a value set forth in Table 1.

Main Baking Step

The temporarily baked powder obtained as described above was molded and mainly baked to produce a sintered body of Example 14. The main baking was performed in ambient atmosphere, the heating temperature was set at 650° C., and the retention time was set at 720 minutes.

Example 15

Temporary Baking Step

A temporarily baked body and a temporarily baked powder were produced in the same step as that of Example 1 except that using $Li_3BO_3$ (manufactured by Toshima Manufacturing Co., Ltd., purity of 99.9% by mass), $H_3BO_3$ (manufactured by KANTO CHEMICAL CO., INC., purity of 99.5%), $Y_2O_3$ (manufactured by Shin-Etsu Chemical Co., Ltd., purity of 99.9% by mass), and $SnO_2$ (manufactured by Mitsuwa Chemicals Co., Ltd., purity of 99.7%) as raw materials, each raw material was weighed in stoichiometric amounts so as to make $Li_{5.975}Y_{0.975}Sn_{0.025}B_3O_9$, and except that the heating temperature in the temporary baking was set at 600° C.

Main Baking Step

The temporarily baked powder obtained as described above was molded and mainly baked by discharge plasma sintering (SPS), to produce a sintered body of Example 15. The heating temperature was set as listed in Table 1, the pressure was set at 30 MPa, and the retention time was set at 10 minutes.

Examples 16 to 17

Temporary Baking Step

A temporarily baked body and a temporarily baked powder were produced in the same step as that of Example 1 except that each of the raw materials described above was weighed in stoichiometric amounts so that x was a value set forth in Table 1, and except that the heating temperature in the temporary baking was set at 600° C.

Main Baking Step

The temporarily baked powder obtained as described above was molded and mainly baked by discharge plasma sintering (SPS), to produce each sintered body of Examples 16 to 17. Each heating temperature was set as listed in Table 1, each pressure was set at 30 MPa, and each retention time was set at 10 minutes.

Examples 18 to 19

Temporary Baking Step

A temporarily baked body and a temporarily baked powder were produced in the same step as that of Example 1 except that each of the raw materials described above was weighed in stoichiometric amounts so that x and y were values set forth in Table 1, and except that the heating temperature in the temporary baking was set at 600° C.

Main Baking Step

The temporarily baked powder obtained as described above was molded and mainly baked to produce each sintered body of Examples 18 to 19. The main baking was performed in ambient atmosphere, each heating temperature was set at 600° C., and each retention time was set at 720 minutes.

Example 20

Temporary Baking Step

A temporarily baked body and a temporarily baked powder were produced in the same step as that of Example 1 except that each of the raw materials described above was weighed in stoichiometric amounts so that x was a value set forth in Table 1, and except that the heating temperature in the temporary baking was set at 600° C.

Main Baking Step

The temporarily baked powder obtained as described above was molded and mainly baked by discharge plasma sintering (SPS), to produce a sintered body of Example 20. The heating temperature was set as listed in Table 1, the pressure was set at 30 MPa, and the retention time was set at 10 minutes.

Examples 21 to 22

Temporary Baking Step

A temporarily baked body and a temporarily baked powder were produced in the same step as that of Example 1 except that each of the raw materials described above was weighed in stoichiometric amounts so that x and y were values set forth in Table 1, and except that the heating temperature in the temporary baking was set at 600° C.

Main Baking Step

The temporarily baked powder obtained as described above was molded and mainly baked to produce each sintered body of Examples 21 to 22. The main baking was performed in ambient atmosphere, each heating temperature was set at 650° C., and each retention time was set at 720 minutes.

Example 23

Temporary Baking Step

A temporarily baked body and a temporarily baked powder were produced in the same step as that of Example 1 except that each of the raw materials described above was weighed in stoichiometric amounts so that z was a value set forth in Table 1.

Main Baking Step

The temporarily baked powder obtained as described above was molded and mainly baked by discharge plasma sintering (SPS), to produce a sintered body of Example 23. The heating temperature was set as listed in Table 1, the pressure was set at 30 MPa, and the retention time was set at 10 minutes.

Comparative Example 1

Temporary Baking Step

A temporarily baked body and a temporarily baked powder were produced in the same step as that of Example 1 except that using $Li_3BO_3$ (manufactured by Toshima Manufacturing Co., Ltd., purity of 99.9% by mass), $H_3BO_3$ (manufactured by KANTO CHEMICAL CO., INC., purity of 99.5%), and $Y_2O_3$ (manufactured by Shin-Etsu Chemical Co., Ltd., purity of 99.9% by mass) as raw materials, each raw material was weighed in stoichiometric amounts so as to make $Li_6YB_3O_9$.

Main Baking Step

The temporarily baked powder obtained as described above was molded and mainly baked by discharge plasma sintering (SPS), to produce a sintered body of Comparative Example 1. The heating temperature was set at 700° C., the pressure was set at 30 MPa, and the retention time was set at 10 minutes.

Comparative Example 2

Temporary Baking Step

A temporarily baked body and a temporarily baked powder were produced in the same step as that of Example 1 except that using $Li_3BO_3$ (manufactured by Toshima Manufacturing Co., Ltd., purity of 99.9% by mass), $H_3BO_3$ (manufactured by KANTO CHEMICAL CO., INC., purity of 99.5%), $ZrO_2$ (manufactured by Nippon Denko Co., Ltd., purity of 99.9%), and $CeO_2$ (manufactured by Shin-Etsu Chemical Co., Ltd., purity of 99.9%) as raw materials, each raw material was weighed in stoichiometric amounts so as to make $Li_{5.000}Zr_{0.800}Ce_{0.200}B_3O_9$.

Main Baking Step

The temporarily baked powder obtained as described above was molded and mainly baked to produce a sintered body of Comparative Example 2. The main baking was performed in ambient atmosphere, the heating temperature was set at 550° C., and the retention time was set at 720 minutes.

By the methods described above, the sintered bodies of Examples 1 to 23 and Comparative Examples 1 to 2 were subjected to composition analysis, the measurement of an X-ray diffraction peak, and the calculation of a lattice volume. Moreover, an ionic conductivity was measured by the following method. The method of measuring an ionic conductivity will be described below. Moreover, the obtained evaluation results are set forth in Table 1.

Measurement of Ionic Conductivity

Two surfaces, facing each other in parallel and having a large area, of each sintered body that was obtained in the main baking and had a flat plate shape were polished with sandpaper. The size of the sintered body having the flat plate shape can be set at, for example, 0.9 cm×0.9 cm×0.05 cm, but is not limited thereto. The polishing was performed, first with #500 for 15 minutes to 30 minutes, then with #1000 for 10 minutes to 20 minutes, and finally with #2000 for 5 minutes to 10 minutes, and was completed when neither conspicuous recess/projection nor flaw was visually observed on the polished surfaces.

Then, gold was deposited on the polished surfaces of the sintered body using a sputtering apparatus SC-701MkII ADVANCE manufactured by Sanyu Electron Co., Ltd. A measurement sample was made in which as deposition conditions, a process gas was Ar, a vacuum degree was set at 2 Pa to 5 Pa, and deposition time was set at 5 minutes. Then, the alternating-current impedance of the measurement sample was measured.

An impedance/gain phase analyzer SI1260 and a dielectric interface system 1296 (both of which were manufactured by Solartron) were used in the measurement of the impedance, and the conditions of the measurement were set at a temperature of 27° C., an amplitude of 20 mV, and a frequency of 1 MHz to 0.1 Hz.

The resistance of the sintered body was calculated using a Nyquist plot obtained in the impedance measurement, and alternating current analysis software ZVIEW manufactured by Scribner. An equivalent circuit corresponding to the measurement sample was set by ZVIEW, and the fitting and analysis of the equivalent circuit and the Nyquist plot were performed to calculate the resistance of the sintered body. The ionic conductivity was calculated from the following equation using the calculated resistance, the thickness of the sintered body, and an electrode area.

Ionic conductivity(S/cm)=thickness(cm) of sintered body/(resistance(s)) of sintered body×electrode area($cm^2$))

Results

The stoichiometric amounts (metal elements represented by M1, M2, and M3 in general formula: $Li_{6-x-y-2z}Y_{1-x-y-z}M1_xM2_yM3_zB_3O_9$, and values of x, y, and z) of the raw materials, a heating method, and a heating temperature in the case of producing each of the sintered bodies of Examples 1 to 23 and Comparative Examples 1 to 2 are listed in Table 1. Moreover, the diffraction peak position, lattice volume, and ionic conductivity in each of the sintered bodies obtained in Examples 1 to 23 and Comparative Examples 1 to 2 are listed in Table 1.

As a result of the composition analysis described above, all the sintered bodies of Examples 1 to 23 and Comparative Example 1 were confirmed to have the compositions in the stoichiometric amounts of the raw materials set forth in Table 1. Moreover, the sintered bodies of Examples 1 to 23 were ion conductive solids indicating the high ionic conductivities even if the baking was performed at a temperature of less than 700° C. In contrast, $ZrO_2$ and $CeO_2$ used as the raw materials coexisted in the main crystal structure of the sintered body of Comparative Example 2.

Further, a relationship between the ionic conductivity of an ion conductive solid and a value of x+y+z in general formula is shown in FIG. 1. Further, a relationship between the ionic conductivity of an ion conductive solid and a diffraction peak position measured by XRD is shown in FIG. 4.

TABLE 1

| | M1 | M2 | M3 | x | y | z | Heating method | Baking temperature (° C.) | Peak position (°) | Lattice volume (Å$^3$) | Ionic conductivity (S/cm) |
|---|---|---|---|---|---|---|---|---|---|---|---|
| Example 1 | Zr | — | — | 0.025 | 0.000 | 0.000 | SPS | 630 | 27.947 | 754.43 | 5.79 × 10$^{-6}$ |
| Example 2 | Zr | — | — | 0.050 | 0.000 | 0.000 | SPS | 630 | 27.959 | 753.63 | 8.78 × 10$^{-6}$ |
| Example 3 | Zr | — | — | 0.075 | 0.000 | 0.000 | SPS | 640 | 27.990 | 753.55 | 1.28 × 10$^{-5}$ |
| Example 4 | Zr | — | — | 0.100 | 0.000 | 0.000 | SPS | 650 | 28.010 | 753.09 | 1.44 × 10$^{-5}$ |
| Example 5 | Zr | — | — | 0.150 | 0.000 | 0.000 | SPS | 660 | 28.018 | 753.30 | 9.51 × 10$^{-6}$ |
| Example 6 | Zr | — | — | 0.200 | 0.000 | 0.000 | SPS | 660 | 27.988 | 753.43 | 1.01 × 10$^{-5}$ |
| Example 7 | Zr | — | — | 0.300 | 0.000 | 0.000 | SPS | 650 | 27.991 | 752.89 | 6.71 × 10$^{-6}$ |
| Example 8 | Zr | — | — | 0.400 | 0.000 | 0.000 | SPS | 650 | 28.043 | 752.59 | 4.70 × 10$^{-6}$ |
| Example 9 | Zr | — | — | 0.600 | 0.000 | 0.000 | SPS | 600 | 28.067 | 752.54 | 5.45 × 10$^{-7}$ |
| Example 10 | Zr | — | — | 0.100 | 0.000 | 0.000 | Baking in atomosphere | 650 | 28.008 | 753.17 | 8.64 × 10$^{-6}$ |
| Example 11 | Ce | — | — | 0.100 | 0.000 | 0.000 | SPS | 660 | 27.939 | 757.53 | 6.92 × 10$^{-7}$ |
| Example 12 | — | — | Nb | 0.000 | 0.000 | 0.100 | SPS | 600 | — | — | 1.10 × 10$^{-6}$ |
| Example 13 | Zr | Ce | — | 0.100 | 0.025 | 0.000 | Baking in atomosphere | 650 | 28.012 | 753.94 | 1.68 × 10$^{-5}$ |
| Example 14 | Ce | — | — | 0.025 | 0.000 | 0.000 | Baking in atomosphere | 650 | 27.946 | 755.83 | 9.17 × 10$^{-7}$ |
| Comparative Example 1 | — | — | — | 0.000 | 0.000 | 0.000 | SPS | 700 | 27.925 | 756.14 | 5.61 × 10$^{-11}$ |
| Example 15 | Sn | — | — | 0.025 | 0.000 | 0.000 | SPS | 600 | 27.930 | 755.97 | 1.31 × 10$^{-5}$ |
| Example 16 | Sn | — | — | 0.100 | 0.000 | 0.000 | SPS | 650 | 27.929 | 756.27 | 1.92 × 10$^{-5}$ |
| Example 17 | Sn | — | — | 0.200 | 0.000 | 0.000 | SPS | 630 | 27.931 | 756.18 | 4.97 × 10$^{-3}$ |
| Example 18 | Zr | Ce | — | 0.600 | 0.300 | 0.000 | Baking in atomosphere | 600 | *1 | — | 4.63 × 10$^{-3}$ |
| Example 19 | Zr | Ce | — | 0.700 | 0.200 | 0.000 | Baking in atomosphere | 600 | *1 | — | 2.80 × 10$^{-3}$ |
| Example 20 | Ce | — | — | 0.800 | 0.000 | 0.000 | SPS | 600 | *1 | — | 1.35 × 10$^{-3}$ |
| Example 21 | Zr | Ce | — | 0.050 | 0.025 | 0.000 | Baking in atomosphere | 650 | 27.998 | 753.21 | 7.99 × 10$^{-6}$ |
| Example 22 | Zr | Ce | — | 0.150 | 0.025 | 0.000 | Baking in atomosphere | 650 | 28.006 | 752.89 | 1.29 × 10$^{-5}$ |
| Example 23 | — | — | Nb | 0.000 | 0.000 | 0.100 | SPS | 650 | 27.916 | 755.02 | 3.50 × 10$^{-5}$ |
| Comparative Example 2 | Zr | Ce | — | 0.800 | 0.200 | 0.000 | Baking in atomosphere | 550 | *2 | — | *3 |

In the table, "-" in the columns of "Peak position" and "Lattice volume" shows that data was not acquired. Moreover, "*1" in the column of "Peak position" shows that no peak was observed in the range of 2θ=27.5° to 28.5°. "*2" in the column of "Peak position" shows that no peak of an oxide represented by Li$_6$YB$_3$O$_9$ was observed. "*3" in the column of "Ionic conductivity" shows that it was impossible to measure an ionic conductivity due to high resistance.

Figure 2:
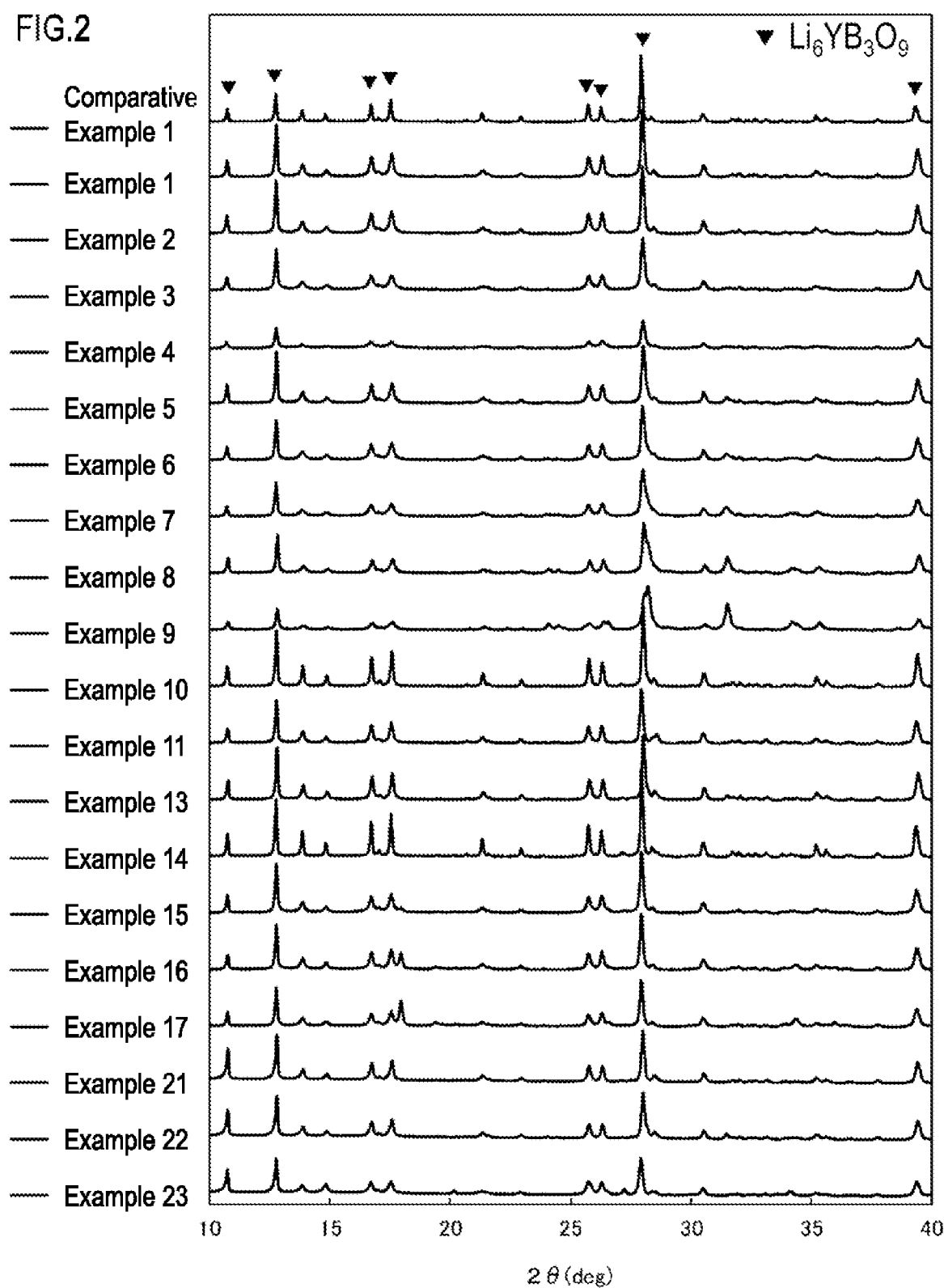
FIG. 2 shows diffraction curves, obtained in XRD, at 2θ=10° to 40°.

Diffraction curves, obtained in XRD, are shown in FIGS. 2 to 3. FIG. 2 shows the diffraction curves in the range of 2θ=10° to 40°, and FIG. 3 shows the diffraction curves in the range of 2θ=27.5° to 28.5°. FIG. 2 reveals that each of the major crystal structures in Examples 1 to 11, 13 to 17, and 21 to 23 was the monoclinic structure of Li$_6$YB$_3$O$_9$.

Moreover, FIG. 3 enables the peak positions at 2θ=around 28.000° in Examples 1 to 11, 13 to 17, 21, and 22 to be confirmed to shift to higher angle sides than 27.925° in Comparative Example 1. Further, FIG. 3 enables the peak position at 2θ=around 28.000° in Example 23 to be confirmed to shift to a lower angle side than 27.925° in Comparative Example 1. The present inventors presume that the above resulted from the substitution of some of trivalent metal elements Y with at least one metal element selected from the group consisting of M1, M2, and M3.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An ion conductive solid electrolyte comprising an oxide represented by formula: Li$_{6-x-y-2z}$Y$_{1-x-y-z}$M1$_x$M2$_y$M3$_z$B$_3$O$_9$, wherein M1 and M2 are each independently at least one metal element selected from Zr, Ce and Sn, M3 is Nb, and x, y, and z represent real numbers satisfying 0.000≤x+y<1.000, 0.000≤z<1.000, and 0.000<x+y+z<1.000, provided that:

when M1 is Ce and y=z=0.000, then 0.025≤x<1.000; and when M2 is Ce and x=z=0.000, then 0.025≤y<1.000.

2. The ion conductive solid electrolyte according to claim 1, wherein:

y=z=0.000,

M1 is Zr, and 0.000<x<1.000.

3. The ion conductive solid electrolyte according to claim 1, wherein a diffraction peak is in a range of 2θ=27.930° to 28.100° in X-ray diffraction analysis using CuKα ray.

4. The ion conductive solid electrolyte according to claim 1, wherein a lattice volume is 752.00 Å$^3$ to 756.00 Å$^3$.

5. An all-solid-state battery comprising at least:

a cathode comprising a cathode active material;

an anode comprising an anode active material; and an electrolyte, wherein at least one selected from a group consisting of the cathode, the anode, and the electrolyte comprises the ion conductive solid electrolyte according to claim 1.

6. The all-solid-state battery according to claim 5, wherein at least the electrolyte comprises the ion conductive solid electrolyte.

* * * * *